US008874503B2

(12) United States Patent
Scherr et al.

(10) Patent No.: US 8,874,503 B2
(45) Date of Patent: Oct. 28, 2014

(54) METHOD, SYSTEM AND APPARATUS FOR ORGANIZING INFORMATION FOR MANAGING LIFE AFFAIRS

(75) Inventors: Allan Lee Scherr, Rhinebeck, NY (US); Werner Hans Erhard, Grand Cayman Islands (KY); Miriam Zivia Diesendruck, San Rafael, CA (US)

(73) Assignee: JMW Productivity, LLC, Stamford, CT (US)

( * ) Notice: Subject to any disclaimer, the term of this patent is extended or adjusted under 35 U.S.C. 154(b) by 3533 days.

(21) Appl. No.: 10/195,842

(22) Filed: Jul. 15, 2002

(65) Prior Publication Data

US 2004/0010513 A1    Jan. 15, 2004

(51) Int. Cl.
G06F 17/30        (2006.01)
G06Q 10/10        (2012.01)
H04L 29/06        (2006.01)

(52) U.S. Cl.
CPC ............... *G06Q 10/10* (2013.01); *H04L 67/42* (2013.01)
USPC ............................ 707/608; 715/786; 709/238

(58) Field of Classification Search
USPC ............. 707/104.1, 10, 3, 608, 618; 715/786; 709/238
See application file for complete search history.

(56) References Cited

U.S. PATENT DOCUMENTS

| | | | | |
|---|---|---|---|---|
| 5,819,263 | A * | 10/1998 | Bromley et al. | 707/3 |
| 5,829,002 | A * | 10/1998 | Priest | 1/1 |
| 6,006,227 | A | 12/1999 | Freeman et al. | 707/7 |
| 6,137,470 | A * | 10/2000 | Sundstrom et al. | 715/786 |
| 6,209,038 | B1 * | 3/2001 | Bowen et al. | 709/238 |
| 6,216,110 | B1 * | 4/2001 | Silverberg | 705/7.19 |
| 6,256,773 | B1 * | 7/2001 | Bowman-Amuah | 717/121 |
| 6,434,590 | B1 * | 8/2002 | Blelloch et al. | 718/102 |
| 6,571,235 | B1 * | 5/2003 | Marpe et al. | 707/3 |
| 6,581,039 | B2 * | 6/2003 | Marpe et al. | 705/7 |
| 6,671,692 | B1 * | 12/2003 | Marpe et al. | 707/102 |
| 6,671,693 | B1 * | 12/2003 | Marpe et al. | 707/102 |
| 6,678,698 | B2 * | 1/2004 | Fredell et al. | 707/104.1 |
| 6,799,085 | B1 * | 9/2004 | Crisp, III | 700/236 |
| 7,077,806 | B2 * | 7/2006 | Ackermann et al. | 600/300 |
| 7,261,690 | B2 * | 8/2007 | Teller et al. | 600/300 |
| 7,285,090 | B2 * | 10/2007 | Stivoric et al. | 600/300 |
| 7,293,029 | B2 * | 11/2007 | Cope | 707/100 |
| 2001/0014893 | A1 * | 8/2001 | Boothby | 707/201 |
| 2004/0010513 | A1 * | 1/2004 | Scherr et al. | 707/104.1 |

OTHER PUBLICATIONS

A New Approach to Business Processes, IBM Systems Journal; vol. 32, No. 1, pp. 80-98, Mar. 19, 1993.

* cited by examiner

*Primary Examiner* — Jean M Corrielus
(74) *Attorney, Agent, or Firm* — Baker Botts L.L.P.

(57) ABSTRACT

A system and method are provided for organizing information that can be shared among multiple individuals. The information is structured and categorized according to areas of concern, sub-areas of concern, concerns, outcomes, commitments, and occasions. Multiple disparate individuals may be associated with one or more areas of concern, concerns, outcomes, commitments, and/or occasions. If one individual fails to achieve an outcome, the remaining individuals may be notified automatically, enabling corrective action to be taken. New areas of concern, and their associated concerns, outcomes, and occasions may be added for one or more individuals. Additional features, such as calendars, to-do lists, and other features may be integrated with the present invention. Web-based and/or client-server interfaces can be used to review and/or update system information. Messages and conversations can be associated with particular nodes within the concern cascade.

2 Claims, 6 Drawing Sheets

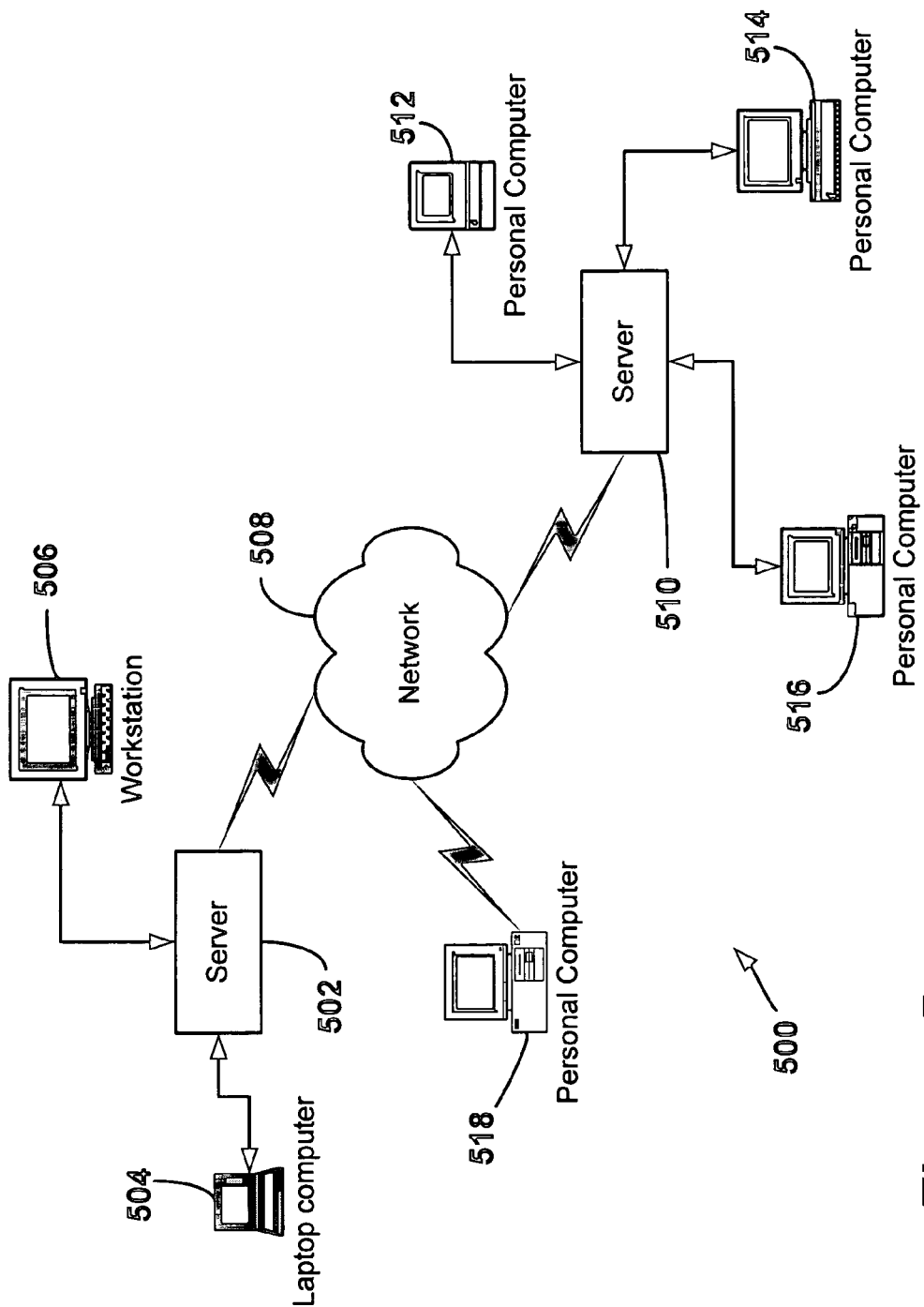

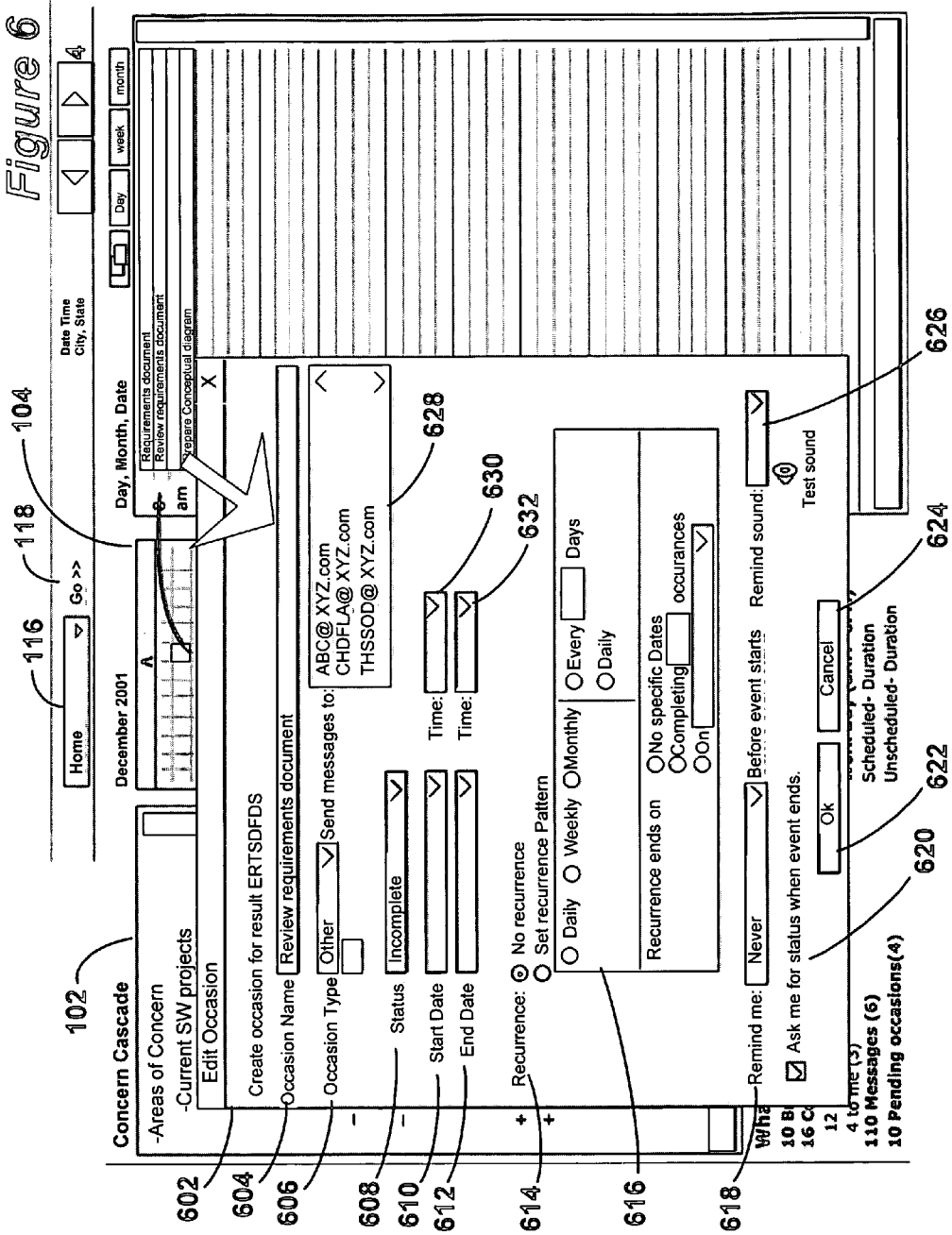

METHOD, SYSTEM AND APPARATUS FOR ORGANIZING INFORMATION FOR MANAGING LIFE AFFAIRS

BACKGROUND OF THE INVENTION TECHNOLOGY

1. Field of the Invention

The present invention is related to data structure and organization. More particularly, the present invention is related to a system and method for storing, organizing, retrieving, and manipulating information in such a way that enables individuals to better manage their life activities.

2. Description of the Related Art

Current personal information managers, such as KPIM, by the KDE consortium, available for free at http://pim.kde.org/, allow individuals to organize information such as address books, notes, calendar items, tasks, to-do lists, etc., with a personal computer ("PC") or personal digital assistant ("PDA"). Groupware software programs, such as Lotus Notes, which is manufactured by International Business Machines Corporation of Armonk, N.Y., combine the aspects of a personal information assistant with e-mail and other features that allow groups of individuals, for example, to coordinate meetings, and share documents. While useful, the above-identified applications do not attempt to organize the significance of the organization in any meaningful way. Instead, all information is treated as equivalent to any other piece of information. There is a need, therefore, in the art for an apparatus, system, and/or method for enabling users to organize information as a function of significance, as well as by type.

SUMMARY OF THE INVENTION

The present invention remedies the shortcomings of the prior art by providing an apparatus, system, and method for organizing information by the significance of the information, as well as by type of information. The information, so organized, allows individual and/or group-wide activities to be monitored and conducted more efficiently.

According to the present invention, there is a method and system for organizing information in a database and attendant software that resides on at least one server that is connected to a network, such as a local area network ("LAN") and/or a wide area network ("WAN"). Although the present invention is preferably used on a network, it is possible to use the present invention as a standalone device, where that device acts as both the client (user interface) and server (data repository). Preferably, however, one or more client devices, such as PCs, workstations, personal digital assistants, and the like are connected to the server by a network so that individuals can access and/or modify the information that is stored in a database. Information is stored within the present invention in a database having a unique structure that facilitates the definition of, and coordination of tasks among one or more individuals. The structure of information within the present invention also facilitates the tracking of the status of the steps needed to complete a task or a project that satisfies a particular goal. Moreover, the present invention also tracks those actions that are not done now (but could be) and those actions that will never be done now.

The present invention stores the information in a unique structure called a "concern cascade" or "structure of fulfillment." At the top of the concern cascade is one or more areas of concern ("AoC"(s)). Each "AoC" can have one or more sub-areas of concern ("sub-AoC"(s)) or one or more specific concerns. Each sub-AoC can have one or more sub-AoCs, as well as concerns. Each concern, in turn, can have one or more outcomes. Each outcome can have one or more commitments. Each commitment can have one or more occasions. Commitments are results that are committed to you and/or to others that realize outcomes and thus fulfill shared concerns. The present invention can be used, among other things, as a unique system and method for tracking the status and progress of projects in a way that captures not only the project-specific tasks, but also the externalities that may affect the project's progress. Each AoC, each sub-AoC, each concern, each outcome, each commitment, and each occasion can have a unique set of data fields. The number and type of data fields can be altered to suit particular problems that are encountered by the users of the present invention.

Each data field of information that is stored within the present invention may be input, queried, received, modified, and/or deleted by users through the client devices that are attached to the network and/or the server that hosts the various processes of the present invention. Other elements of information management, such as personal information managers, e-mail servers, server and/or workstation file systems, instant messaging servers and the like, further enable the present invention to issue alerts, alarms, notifications, etc. to individuals who are associated with various AoCs, and to track information related to the specific AoC, sub-AoC, concern, outcome, commitment, and/or occasion. Thus, the present invention is able to notify groups of individuals having a common AoC when an outcome, commitment, and/or occasion is satisfied or not. Information can be summarized, noted, listed, and otherwise disseminated automatically to all or selected members of a group containing one or more individuals. The present invention thus enables the groups of individuals to manage situations more efficiently when specific events happen or fail to happen.

BRIEF DESCRIPTION OF THE DRAWINGS

A more complete understanding of the present disclosure and advantages thereof may be acquired by referring to the following description taken in conjunction with the accompanying drawings wherein:

FIG. 5 is a block diagram illustrating the system of the present invention.

FIG. 6 is a block diagram illustrating the input or modification of information according to the teachings of the present invention.

Figure 1:
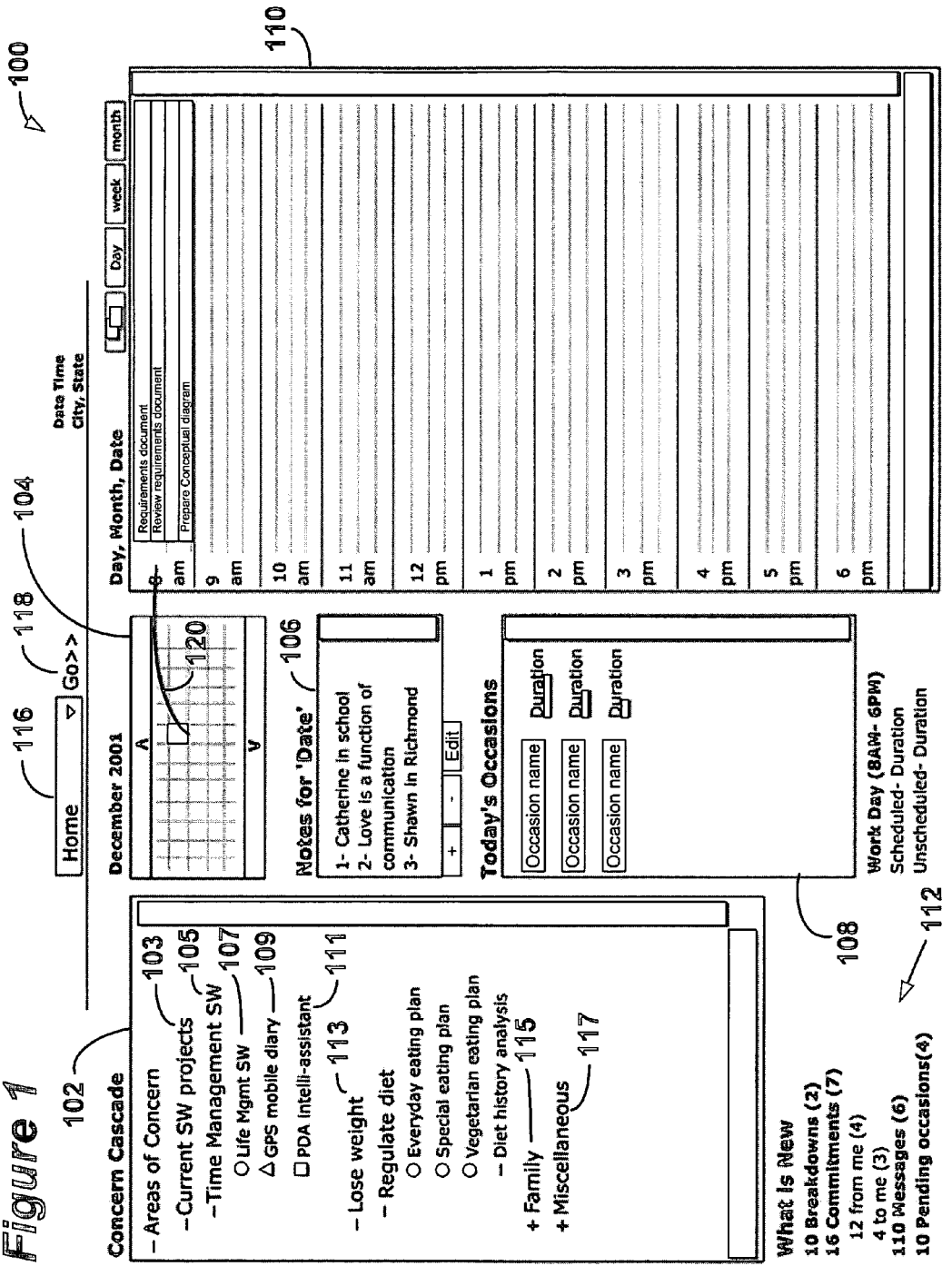
FIG. 1 is a block diagram of a screen display of information according to the teachings of the present invention.

The present invention may be susceptible to various modifications and alternative forms. Specific embodiments of the present invention are shown by way of example in the drawings and are described herein in detail. It should be understood, however, that the description set forth herein of specific embodiments is not intended to limit the present invention to the particular forms disclosed. Rather, all modifications, alternatives and equivalents falling within the spirit and scope of the invention, as defined by the appended claims, are to be covered.

DETAILED DESCRIPTION OF SPECIFIC EMBODIMENTS

The present invention is directed to an apparatus, system, and method for organizing information in a systematic way that further enhances an individual's, or group of individuals' ability, to coordinate their activities, achieve their goals, or to better accommodate the failure to meet one or more of those goals. The present invention utilizes software on client and server hardware, preferably, over a local area network ("LAN") and/or over a wide area network ("WAN") in order to facilitate collaboration among multiple individuals or other software processes. The present invention is enhanced by inclusion of other features, such as calendars, notes, to-do lists, automatic notification (alarms), and the like. Thus, the present invention provides a framework around which goals and tasks may be discovered, assigned, and tracked with the results affecting the means and ends of other goals.

The present invention relies upon the novel concept of organizing what a person does and what a person is not doing. While individuals complete certain tasks, or attain stated goals, there are also things that they said that they would do, things that they were asked to do, and things that they wanted to do. To handle task and time allocation, individuals utilize to-do lists, e-mail, in-baskets, mail and memorandums, draft reports, receive incoming calls, use voice mail an paper phone messages, use calendars, conduct meetings, schedule appointments, etc. Individuals also work under internal or external deadlines, endure interruptions, handle emergencies, and try to juggle work and family. The fact is, however, that individuals will never accomplish everything they have to do or want to do in their lives. The present invention provides individuals and groups with the means to manage what they are doing as well as what they are not doing.

The present invention enables an individual, or group of individuals, to accommodate both success and the lack of success in one or more areas of endeavor. In doing so, the present invention organizes information associated with both the ends and the means to those ends by the significance of those ends. The hierarchical manner of organizing ends according to the present invention takes advantage of the poorly appreciated fact that most ends are simply means to other ends and that achieving certain ends are often simply one step toward achieving another goal that satisfies a concern of the individual or group. The hierarchical structure of information contained within the present invention also has other benefits. It has been observed that the inability to perform one sub-task has a ripple effect on the entire effort. The present invention provides a mechanism for accommodating unfulfilled tasks so that the effect on other (typically broader) tasks and projects may be assessed so that corrective action, or alternative plans, may be implemented.

The concept of a concern is central to the method and the system of the present invention and the information identified by the present invention is generally centered on a concern. For individuals, the way that a person is, and what that person does, is powerfully shaped by the particular set of concerns that the individual desires to fulfill. For organizations, the actions and culture of any organization is powerfully shaped by the particular set of concerns that the organization exists to fulfill. Concerns are thus central to the lives of individuals and organizations. The present invention facilitates the selective sharing of concerns, areas of concern, and their associated cascades with individuals or groups that have those issues in common. For instance, a group may share a set of concerns that define their common project. The manager of the group would share those concerns with the group, and also share a different, more senior set of concerns with his manager.

The present invention arranges information into a "concern cascade." The main concerns of the individual or organization are listed within the present invention. From this list of concerns, and for each individual concern, come the detailed actions that are taken or not taken. In contrast to the prior art, however, the present invention also accommodates actions which may not (or will not) be accomplished in addition to those actions that the individual intends to fulfill. For actions that are not taken, there are two separate categories, namely: those actions that individuals are not doing now, and those that the individuals are never doing now. Actions that the individual is not doing now are those that the individual doesn't have time for at that moment, but will attempt if time becomes available. Actions that individuals are never doing now are those that the individual would not do, even if they had the time. In some prior art systems, the actions that the individual would never do now are simply deleted immediately as unimportant. However, such a deletion would be a crucial mistake. Knowing what one won't do is as much of an indicator of the focus of an individual as knowing what one is doing. While actions that an individual are never doing now are kept for some purposes by the present invention, they are also metaphorically placed in a queue to go out of existence (and deleted from the database or file system). However, they remain in the particular queue for certain purposes, such as warning the user that the "not doing now" queue is becoming large, which may indicate that underlying problems exist or persist. Note, however, that the data structure of the present invention is capable of storing a virtually unlimited amount of information in the various queues. Any limits on the size of the queues are imposed solely by the users.

The present invention utilizes a concern cascade that goes from high-level concerns down to the individual actions that are taken to realize a desired outcome of the concern. The concern cascade starts with a high level element called an "area of concern" ("AoC"). The AoC is essentially a mechanism for organizing particular concerns, and there may be multiple sub-areas of concern ("sub-AoC(s)") for any given AoC. For example, concerns may be related, and thus grouped into a common AoC. Similarly, related AoCs may be grouped as sub-AoCs under a single AoC. Sub-AoCs may also have other sub-AoCs, and so on. However, once the level of concern is reached, the structure below the concern has a predefined number of levels.

An example of an AoC and its attendant nodes (elements) is illustrated in FIG. 1. As illustrated, the user interface 100 has a concern cascade box 102 that contains a set of one or more nodes. Each of the nodes may contain one or more other nodes. The nodes can represent containers (for other nodes) as well as links to electronic files, messages, alarms, notifications, and other system information. The concern cascade 102 has one or more AoC(s) nodes, such as "Current Software Project" 103, "Lose Weight" 113, "Family" 115, and "Miscellaneous" 117. Below each AoC node is a concern or a sub-AoC node. Concerns are specific to their AoC or sub-AoC. For example, referring again to FIG. 1, a sub-AoC of the Current Software Projects AoC 103 would be "Time Management Software" 105.

On the next level down from the Time Management Software sub-AoC 105 of the concern cascade 102 are the concerns. Examples of concerns within the concern cascade 102 are the "Life Management Software" 107, the "GPS Mobile Diary" 109 and the "PDA Intelli-assistant" 111, all of which are associated with the sub-AoC "Time Management Software" 105, as illustrated in FIG. 1.

As further illustrated in FIG. 1, the present invention may also incorporate other features, such as a calendar 104, a notes feature 106, an occasions feature 108, a day minder 110, and a summary 112. All of the above features may be integrated with one another. Moreover, all of the above-identified features may also be viewed in the form of a web page and the features hyperlinked with other information stored elsewhere. The display of the present invention may also employ the use of Java applets, the technology for which may be licensed by the Sun Microsystems, Inc. of Santa Clara, Calif. Alternatively, the features of the present invention may be displayed using Microsoft's Net technology that is licensed from the Microsoft Corporation of Redmond, Wash. In yet another embodiment, the present invention may be implemented as a traditional client/server application that resides as a process running under an operating system such as Linux (available for free download at http://www.kernel.org/), Microsoft Windows, manufactured by the Microsoft Corporation of Redmond, Wash., or OS X, manufactured by the Apple Computer Corporation of Palo Alto, Calif. Other mechanisms for implementing the present invention can be employed so long as they provide interconnectivity to the requisite number of user applications.

Figure 2:
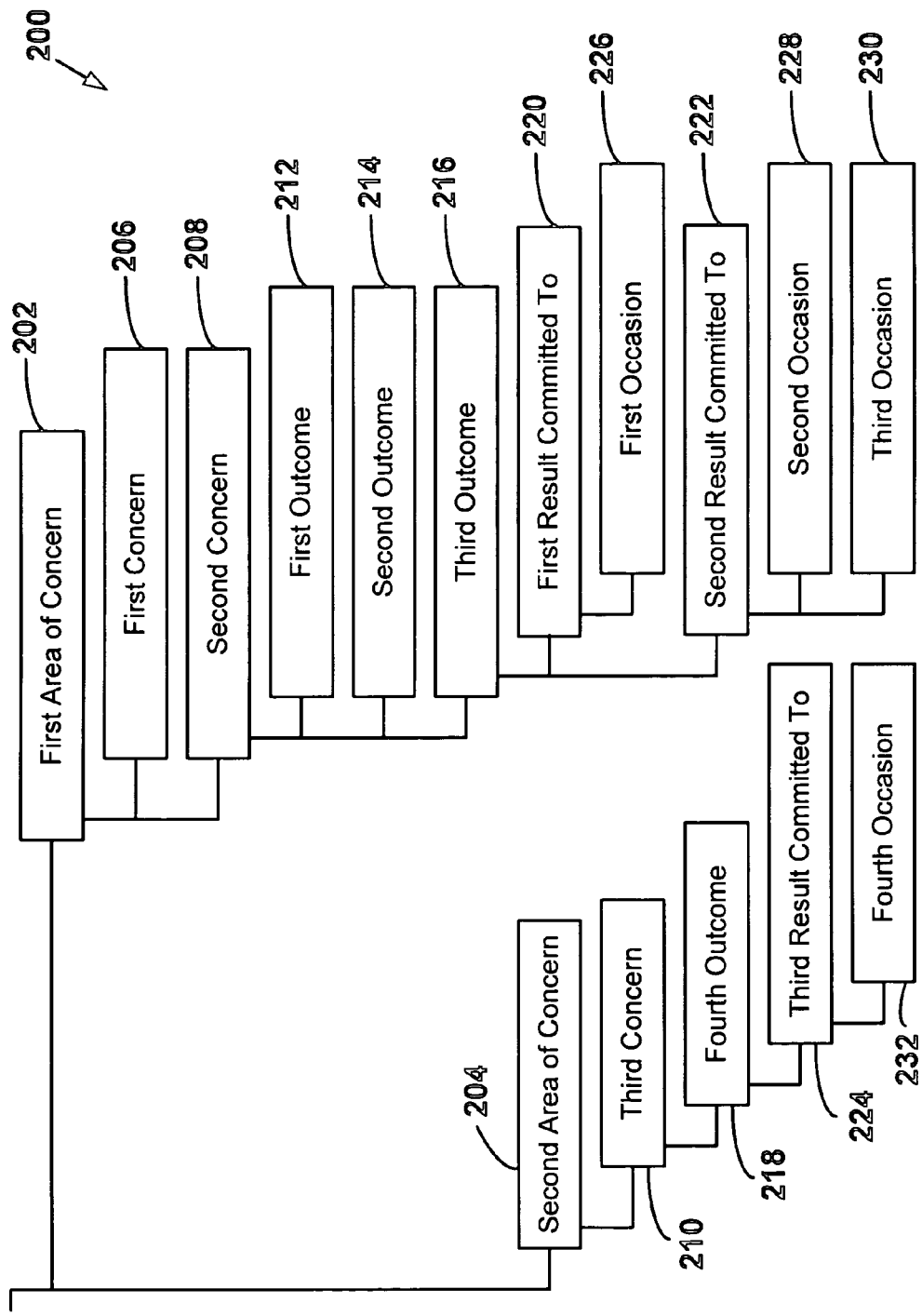
FIG. 2 is a block diagram illustrating the information structure according to the teachings of the present invention.

FIG. 2 illustrates an exemplary embodiment of the arrangement of information according to the teachings of the present invention. The structure 200 of information is illustratively viewed as a tree structure, although other types of illustration and display are possible. At the top level of the cascade 200 are the AoCs, illustrated in FIG. 2 as first AoC 202 and second AoC 204. While there are only two AoCs illustrated in FIG. 2, it will be appreciated that the present invention can handle one or more AoC(s), and there is no intended limit to the number of AoCs imposed by the present invention. The AoCs 202 and 204 represent fundamental areas of concern, each of which could have sub-areas of concern.

Each AoC or sub-AoC can have one or more concerns that are specific to the AoC or sub-AoC. For example, the first AoC 202 has two concerns, namely, first concern 206, and second concern 208. Similarly, the second AoC 204 has associated with it the third concern 210.

Again referring to FIG. 2, a concern can have one or more outcomes. An outcome under a concern is something that, if realized, will unquestionably fulfill the concern. As illustrated in FIG. 2, the second concern 208 has three outcomes, a first outcome 212, a second outcome 214, and a third outcome 216. Similarly, the third concern 210 has a fourth outcome 218. As with the other elements of the concern cascade, there is no requirement that a concern have a specific outcome, nor is there a limit to the number of outcomes for a particular concern.

Further down the cascade from outcomes are commitments. Commitments are things or actions which, if completed on time, will unquestionably fulfill the outcome of the respective concern. Commitments are results that are committed to you and/or to others that realize outcomes and thus fulfill shared concerns. For instance, the third outcome 216 has a first result committed to 220 and a second result committed to 222, as illustrated in FIG. 2. As with other elements of the concern cascade, there is no requirement that an outcome have a specific commitment, nor is there a limit to the number of commitments for a particular outcome.

Figure 3:
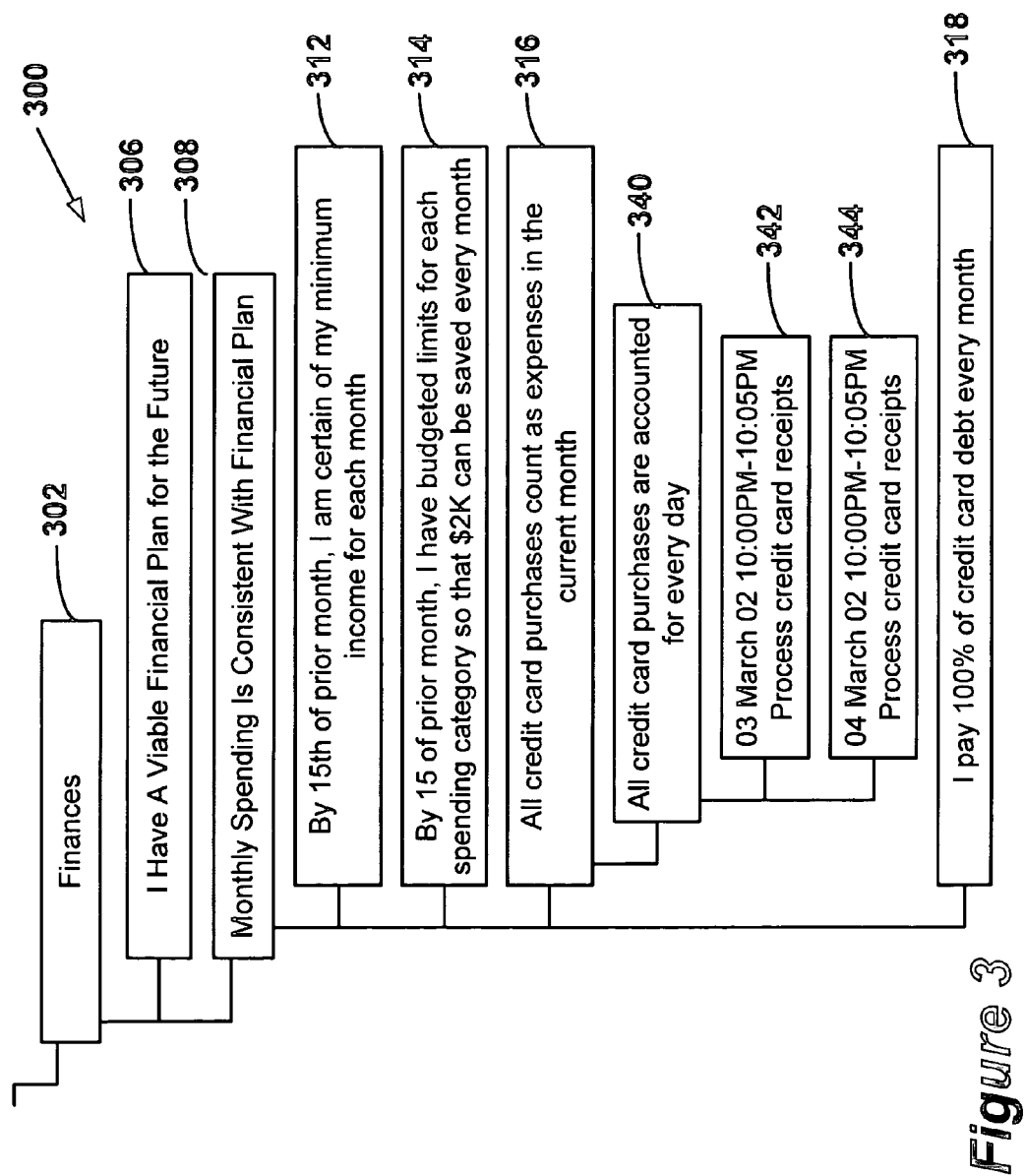
FIG. 3 is a block diagram illustrating an example of the information structure depicted in FIG. 2.
Figure 4:
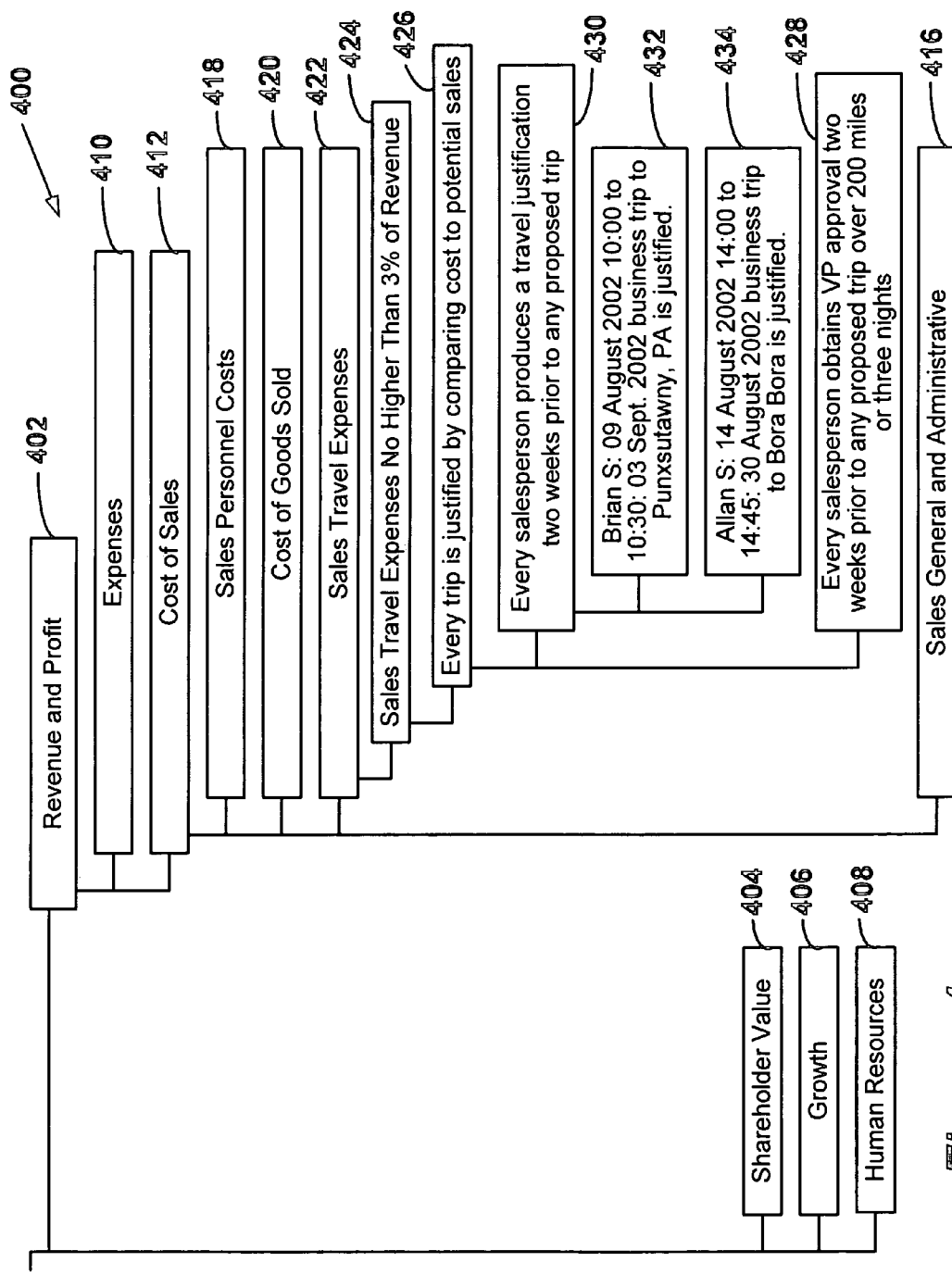
FIG. 4 is a block diagram illustrating another example of the information structure depicted in FIG. 2.

Still further down the concern cascade 200 are occasions. Occasions are opportunities to complete the commitments described above. In other words, occasions are opportunities where one or more individuals take time to perform some task that satisfies (at least partly) a commitment. As with the other elements of the concern cascade 200, a commitment may have zero or more occasions. As illustrated in FIG. 2, the first result committed to 220 has a first occasion 226. Similarly, the second result committed to 222 has a second occasion 228 and a third occasion 230. Finally, the third result committed to 224 of the fourth occasion 218 has a fourth occasion 232. FIGS. 3 and 4 show specific examples for illustrative areas of concern.

FIG. 3 illustrates a concern cascade 300 of a particular AoC, namely, finances 302. In this example, the finances area of concern AoC 302 has two concerns, namely, the concerns that "I have a viable financial plan for the future" 306 and that "monthly spending is consistent with financial plan" 308. In this example, the concern 308 has four outcomes, 312, 314, 316, and 318, as illustrated in FIG. 3. To illustrate the other aspects of the present invention, the example of FIG. 3 has a first result committed to 340 entitled "all credit card purchases are accounted for every day." That particular first result committed to 340 has two occasions 342 and 344, as illustrated in FIG. 3, namely, the occasions to "process credit card receipts" at specific dates and times. The above example is illustrative. However, it will be understood that there can be one or more areas of concern AoC(s), that each AoC can have zero or more concerns, that each concern can have zero or more outcomes, that each outcome can have zero or more commitments, and that each commitment can have zero or more occasions.

FIG. 4 illustrates a second example, but also an alternate embodiment of the present invention wherein the areas of concern are more finely grained. In the example of FIG. 4, there is, of course, at least one AoC. In this example, there are four AoCs, namely: "revenue and profit" 402, "shareholder value" 404, "growth" 406, and "human resources" 408 which describe some of the areas of concern for a business.

The first area of concern AoC 402 has, in this example, three sub-AoCs, namely: "expenses" 410, "cost of sales" 412, and "sales general and administrative" ("sales G&A") 416. In this example, the second sub-AoC 412 has three sub-AoCs, namely, "sales personnel costs" 418, "cost of goods sold" 420, and "sales travel expenses" 422. Further down the concern cascade 400 of the example illustrated in FIG. 4, the third sub-area of concern 422 has a concern "sales travel expenses no higher than 3% of revenue" 424. The concern 424 has a first outcome "every trip is justified by comparing cost to potential sales" 426. The first outcome 426 itself can have a cascade of commitments, as illustrated in FIG. 4. For instance, the first outcome 426 can have a commitment where "every salesperson produces a travel justification two weeks prior to any proposed trip" 430, or "every salesperson obtains VP approval two weeks prior to any proposed trip over 200 miles or three nights" 428. In the example of FIG. 4, there are two occasions based on the commitment 430, namely, the two specific instances (occasions) where a worker justified trips to Punxsutawney, Pa. 432 and to Bora Bora 434. An occasion is the lowest level of any concern cascade because that is the level where time is specifically devoted to satisfying elements of an area of concern, namely, the sub-areas of concern, outcomes, and commitments.

The present invention can be set to track activities, such as the completion of an occasion, commitment, and/or outcome. For example, when the user completes an occasion, the present invention will prompt the user to indicate whether the overall goal of the occasion (i.e., the result committed to) has been accomplished. If so, both the occasion and the commitment will be tagged as completed so that the user and others in the group, if applicable, will know that no other resources need to be committed to that specific goal. Conversely, if the goal has not been achieved, and the time-period for achieving that goal has expired, then the present invention declares a "breakdown." Once a breakdown is declared, the present invention may take pre-defined actions, such as issuing notices to those affected by the breakdown, and/or affecting the status of other elements of the project. While users may, independently, declare a breakdown, the present invention may also employ other breakdown criteria, such as identifying results committed to when there is an absence of occasions, etc. Generally, occasions, commitments, outcomes, and concerns may all have status fields that track their respective standing with respect to formation, completion or abandonment. Although many specific indicators of status are possible, the preferred embodiment of the present invention contemplates status values of "formation," "accomplished" (or "completed"), "pending," "not doing now," and "never doing now." Typically, if the status value does not fit the pre-defined list, the node in question is considered non-existent, such as when an occasion is physically impossible to accomplish. In that situation, if all messages, alarms, etc., that are generated regarding that breakdown have been sent and the node (and/or its contents) are no longer needed by the users and the present invention, then the contents of the node, and the node itself, can be eliminated from the file system and/or database of the present invention. Alternate embodiments of the present invention may allow users to include their own specific values for the status field. The present invention may also be programmed to behave in a particular manner in the event of a breakdown, completion, or elimination of a node or node-type.

The present invention also facilitates contextualization of messaging, in that messages, whether sent via e-mail, telephone, instant messaging, or the like, can be logically associated to a particular AoC, sub-AoC, concern, outcome, commitment and/or occasion. This facilitates the grouping of messages, e.g., a conversation or thread, with a particular node within the concern cascade, such as a particular concern. According to the present invention, if an individual is viewing a particular commitment within the apparatus of the present invention (e.g., on a client device), the individual can start a conversation with a member of the group that is associated with the commitment, and that message will be tagged with an identifier that uniquely identifies that particular commitment and/or conversation. When the recipient of the message replies to the sender (or to others), the tag to the commitment and/or conversation is retained. Additional tags can be applied to identify the particular conversation. Using the message tagging technique according to the present invention, all of the messages that are associated with, for example, a particular concern, can be viewed as a whole and sorted, if need be, by specific conversation or thread. Thus, one concern could have a first set of conversations (threads), and an outcome of that concern could have a second set of conversations that are viewable by individuals having access to that particular concern and/or outcome.

The tagging of messages can be accomplished in a number of ways. For instance, if the message is an e-mail message, an extra line in the transmission header can be added with an identifier of the particular node in the concern cascade and/or the conversation/thread. Alternatively, the text of the message may employ SGML, HTML, XML, or similar languages to embed information such as a concern cascade node and/or conversation/thread within the text/media that is perceived by the recipient. The identifier tag or tags could alternately be embedded into the text of the message itself. An embodiment of the present invention is then constructed and arranged to search, upon receipt of a message, for the identifier tags and logically associate the message with a particular node in the concern cascade and, if necessary, with a given conversation within the set of messages for that particular node.

The present invention provides a context for the negotiation and generation of commitments between individuals and organizations. Specifically, the present invention provides a protocol of offer and acceptance between individuals who are involved with the identification and/or assignment of results that are committed to. The agreement that describes the conversation leading up to the result committed to (and, if necessary, the attendant negotiation documents) can be stored under the specific commitment node within the present invention and displayed, along with the other documents and elements, in the concern cascade 102. The present invention can also make a distinction between commitments that were negotiated, and commitments that are imposed by external forces (e.g., natural disasters, customers, etc.) and upper management. Moreover, the present invention can track the status of the commitment during formation, as well as pending, completed, not doing now, never doing now, and/or breakdown.

Generally, the negotiation of assignment of a commitment starts with the input of a description of the results desired, a due date (or time period) and the status (e.g., offer, acceptance, pending, completed, breakdown, etc.). Once the user submits the input, an object or record is created (or modified) with the database of the present invention. Other fields may also be included into the commitment record to accommodate specific problems/desires.

FIG. 5 illustrates the implementation of the system of the present invention. The system 500 includes one or more servers 502, 510 that can be optionally connected to a network 508, such as a LAN and/or a WAN such as the Internet. The configuration of FIG. 5 allows multiple individuals to utilize the present invention and thus maximize its effectiveness. The present invention can be architected using the standard client/server architecture, with client applications loaded onto, for example, workstation 506, or personal computer PC 518, and the server portion of the application loaded onto server 502. Other embodiments can have the present invention implemented as a completely web-based application, with web server (and attendant software processes) running on server 510 from which access is gained by, for example, PC 512 and 514, the latter of which is equipped only with a web browser. The present invention is amenable to implementations having other architecture with a centralized database.

The preferred embodiment of the present invention utilizes a server, such as servers 502 and/or 510, to store database information pertaining to all the various AoCs, sub-AoCs, concerns, outcomes, commitments, and occasions. The present invention itself is preferably implemented in one or more software processes, although these various processes may also be implemented in hardware or in any combination of hardware and software. Typically, the present invention has a database process with attendant mass storage devices (not shown). Also included are one or more server processes that may receive client requests, formulate queries to the database, receive the response from the database, and format the response for viewing by the user on one or more client devices. Still other processes may be implemented on the client devices, depending upon the particular capabilities or limitations of the client devices.

Information can be stored in a variety of types of databases, including, but not limited to: a relational database, an object database, and a hierarchical database. The information stored at the server 502, 510 are preferably viewed with the use of a JAVA applet via a JAVA-compliant browser with the applet acting as a client process. JAVA is licensed from Sun Microsystems, Inc. of Santa Clara, Calif.

In addition to tagging messages, the present invention is capable of contextualizing other information, such as word processing documents, spreadsheets, web pages, databases, presentations and the like. The contextualization may be accomplished by linking a file system (either a local file system on e.g., workstation 406, or remote, such as one on server 510) to the client processes on the various client devices, such as PC 516. A shadow directory structure may be implemented on the file system that mimics the structure (hierarchy) of the concern cascade 102. The contents of the file system are then overlaid onto the contents of the concern cascade in addition to the information stored within the database of the present invention so that the user can see all information related to the concern, etc. Electronic files, e.g., word processing documents, images, spreadsheets, etc., that are saved in the normal course of business need only be saved to the corresponding concern, commitment, occasion, etc. in order for the other users (that are related to that activity) to have access to that file. As a convenience to the user, the specific files can be saved, modified, and or accessed via the user interface of the present invention. Links (shortcuts) and/or URL addresses to the file may be placed into other subdirectories (e.g., other concerns, commitments, occasions, etc.) of the file in question relates to multiple issues. Moreover, the file systems search, access control, and security tools can be used, intact, to compliment the capabilities of the present invention.

Having the present invention implemented on a network enables multiple individuals to access common information in a systematic and reliable manner, without the need to duplicate data and incur the attendant integrity problems. More importantly, implementing the present invention on a network enables the modeling of a performance "ripple effect" among individuals who are on a common project. For example, a group of individuals may be assigned to a project. A common area of concern for those individuals would be the project itself. The group leader could then define the various concerns for the project, as well as desired outcomes, commitments, and occasions. If, for example, an individual completed an occasion that satisfied completely a commitment, then an outcome of a given concern would be achieved, and all members of the project could be notified by a trigger/alarm feature of the present invention. Similarly, if not more importantly, other individuals of a project may be notified, and/or their workloads represented by the information of the present invention may be changed, if one or more individuals do not complete their assigned tasks. For instance, if one individual were unable to complete the work at a particular occasion, then the parent commitment would not be completed and the parent outcome would not be satisfied. Various notices, e.g., an e-mail, could then be issued by the present invention to individual project members who share the common concern and/or AoC. Such a notice, for example, could be listed in the summary 112 (see FIG. 1), in the notes listing 106, and/or by another notification mechanism. Such notification would enable others to cope with the particular failure, and/or afford management personnel the opportunity to revise schedules and/or change tasks in order to ameliorate the effects of the failure. In this way, the present invention enhances the ability of groups to take quick advantage when necessary steps are completed, or to recover and adapt when tasks are not completed.

A feature of the present invention is that any notification regarding information within the present invention may be promulgated in any manner available to a network, such as: an e-mail, a web-log notice, an instant message, a personal information manager ("PIM") alarm, or the like. Because the present invention can be integrated into an overall personal information system, most any form of notice or communication can be utilized by the present invention.

An illustrative example of the input/editing of a particular element of the information stored within the present invention is illustrated in FIG. 6. A JAVA applet is used to generate a dialog box 602 for a particular occasion having fields and appropriate edit facilities such as: occasion name 604, occasion type 606, status 608, start date 610, start time 630, end date 612 and end time 632, recurrence status 614 and recurrence pattern 616, reminder request 618, ask me toggle 620, audible reminder request 626, OK button 622 and Cancel button 624. It will be understood that dialog boxes may vary for the type of information needed, be it for an AoC, a sub-AoC, a concern, an outcome, a commitment, an occasion, a calendar event, a note, or the like. It is expected that alternate embodiments of the present invention will incorporate specific fields within the various cascades of information contained therein and the above example is only one of many potential examples. It will be understood that particular problems may be better handled if some fields are added or removed from one or more of the cascade levels or nodes of the present invention without departing from the overall structure of the information contained within the present invention. Moreover, the present invention provides a scalable and modular framework upon which additional features may be added or removed with commiserate affect on the performance and capability of the present invention.

The invention, therefor, is well adapted to carry out the objects and to attain the ends and advantages mentioned, as well as others inherent therein. While the invention has been depicted, described and is defined by reference to exemplary embodiments of the invention, such references do not imply a limitation on the invention, and no such limitation is to be inferred. The invention is capable of considerable modification, alternation and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is to be limited only by the spirit and scope of the appended claims, giving full cognizance to equivalents in all respects.

What is claimed is:

1. A method for organizing information on a database residing on at least one server that is connected to a network having at least one client device, the method comprising:

inputting at least one area of concern and storing said area of concern in said database;

inputting a concern associated with said area of concern in said database;

inputting an outcome associated with said concern in said database;

inputting a commitment associated with said outcome in said database; inputting an occasion associated with said commitment in said database;

inputting an identity of a user associated with said outcome;

storing said area of concern, said concern, said outcome, said occasion, and said identity onto said database;

querying for said area of concern in said database with said at least one client device; and receiving said area of concern, said concern, said outcome, said occasion, and said identity, wherein said step of receiving further comprises: grouping occasions for a particular date into a list and displaying said list.

2. A system for organizing information on at least one server that is connected to a network having at least one client device, the system comprising:

a database residing on said at least one server, said database constructed and arranged to store at least one area of concern; and wherein said area of concern may be accessed by said at least one client device, wherein said database is coupled to a personal information assistant, and wherein said database is constructed and arranged to issue an alarm via said personal information manager.

* * * * *